United States Patent
Kerofsky

(10) Patent No.: US 8,902,149 B2
(45) Date of Patent: *Dec. 2, 2014

(54) METHODS AND SYSTEMS FOR POWER CONTROL EVENT RESPONSIVE DISPLAY DEVICES

(75) Inventor: Louis Joseph Kerofsky, Camas, WA (US)

(73) Assignee: Sharp Laboratories of America, Inc., Camas, WA (US)

( * ) Notice: Subject to any disclaimer, the term of this patent is extended or adjusted under 35 U.S.C. 154(b) by 64 days.
This patent is subject to a terminal disclaimer.

(21) Appl. No.: 12/683,615

(22) Filed: Jan. 7, 2010

(65) Prior Publication Data
US 2010/0321587 A1    Dec. 23, 2010

Related U.S. Application Data

(63) Continuation-in-part of application No. 12/486,743, filed on Jun. 17, 2009.

(51) Int. Cl.
*G09G 3/36* (2006.01)
(Continued)

(52) U.S. Cl.
CPC ..... *H04N 21/654* (2013.01); *G09G 2320/0606* (2013.01); *G09G 2360/16* (2013.01); *H04N 21/254* (2013.01); *H04N 21/6332* (2013.01); *H02J 2003/143* (2013.01); *H04N 21/4122* (2013.01); *H04N 21/435* (2013.01); *H04N 21/6543* (2013.01); *G09G 2320/0646* (2013.01); *G09G 3/3611* (2013.01); *G09G 3/3406* (2013.01); *H02J 2003/146* (2013.01); *H04N 21/25891* (2013.01); *H04N 21/4436* (2013.01); *G09G 2330/021* (2013.01); *G09G 2370/04* (2013.01); *H04N 5/63* (2013.01); *H04N 21/235* (2013.01)
USPC .......... 345/102; 345/87; 345/88; 345/98; 345/99; 340/730; 700/291; 700/295; 700/296; 700/297; 700/298

(58) Field of Classification Search
CPC .............. G09G 3/3611; G09G 2320/0606; G09G 2330/021
USPC .......... 345/102, 211, 501; 348/730, E05.127; 340/825.16, 825.69, 538, 310.06
See application file for complete search history.

(56) References Cited

U.S. PATENT DOCUMENTS 5,905,442 A * 5/1999 Mosebrook et al. .......... 340/3.7
2006/0197735 A1* 9/2006 Vuong et al. .................. 345/102
(Continued)

FOREIGN PATENT DOCUMENTS

CN  101036181  9/2007
JP  11-041808  2/1999
(Continued)

OTHER PUBLICATIONS

International Application No. PCT/JP2010/057107—International Search Report.
(Continued)

*Primary Examiner* — Olga Merkoulova
(74) *Attorney, Agent, or Firm* — Chernoff Vilhauer McClung & Stenzel, LLP

(57) ABSTRACT

Aspects of the present invention relate to methods and systems for controlling power consumption with a power controlling display device. Some aspects relate to a power controlling display device that receives a notification of a power control event that may control internal display components as well as connected power consuming devices. Some aspects relate to methods and systems for automatically compensating a displayed image when display backlight levels are modified in response to a power control event.

17 Claims, 6 Drawing Sheets

(51) Int. Cl.
*H04N 21/254* (2011.01)
*H04N 21/6332* (2011.01)
*H04N 21/41* (2011.01)
*H04N 21/435* (2011.01)
*H04N 21/6543* (2011.01)
*G09G 3/34* (2006.01)
*H04N 21/258* (2011.01)
*H04N 21/654* (2011.01)
*H04N 21/443* (2011.01)
*H04N 5/63* (2006.01)
*H04N 21/235* (2011.01)
*H02J 3/14* (2006.01)

(56) References Cited

U.S. PATENT DOCUMENTS

| | | | |
|---|---|---|---|
| 2007/0146236 A1 | 6/2007 | Kerofsky et al. | |
| 2007/0229250 A1* | 10/2007 | Recker et al. | 340/531 |
| 2008/0039980 A1* | 2/2008 | Pollack et al. | 700/295 |
| 2009/0002285 A1* | 1/2009 | Baba et al. | 345/77 |
| 2009/0109232 A1 | 4/2009 | Kerofsky | |
| 2009/0201271 A1* | 8/2009 | Michiyasu et al. | 345/204 |
| 2010/0123725 A1* | 5/2010 | Azar et al. | 345/501 |

FOREIGN PATENT DOCUMENTS

| | | |
|---|---|---|
| JP | 11-313441 | 11/1999 |
| JP | 2005-49751 A | 2/2005 |
| JP | 2006-203720 | 8/2006 |
| JP | 2006-241746 A | 3/2008 |
| JP | 2008-067473 | 3/2008 |
| WO | 2006040998 A1 | 4/2006 |

OTHER PUBLICATIONS

Japanese Official Communication, dated Jan. 8, 2013, Japanese Patent App. No. 2010-288815, Sharp Kabushiki Kaisha, 6 pgs.

English translation of Japanese Official Communication, dated Jan. 8, 2013, Japanese Patent App. No. 2010-288815, Sharp Kabushiki Kaisha, 10 pgs.

English translation of Patent Abstract for Japanese Publication No. 200-049751, published Feb. 24, 2005, 1 pg.

Chinese Office Action, issued Apr. 19, 2013, Chinese Patent App. No. 201110005355.6, entitled "Methods and Systems for Power Control Event Responsive Display Devices," Sharp Kabushiki Kaisha, 7 pgs.

English translation of Chinese Office Action, issued Apr. 19, 2013, Chinese Patent App. No. 201110005355.6, entitled "Methods and Systems for Power Control Event Responsive Display Devices," Sharp Kabushiki Kaisha, 8 pgs.

Chinese Office Action, dated Mar. 4, 2014, Chinese Patent App. No. 201080026902.2, Sharp Kabushiki Kaisha, 12 pgs.

English translation of Chinese Office Action, dated Mar. 4, 2014, Chinese Patent App. No. 201080026902.2, Sharp Kabushiki Kaisha, 10 pgs.

English translation of Patent Abstract for Japanese Publication No. 2006-241746, published Mar. 21, 2003, 1 pg.

\* cited by examiner

METHODS AND SYSTEMS FOR POWER CONTROL EVENT RESPONSIVE DISPLAY DEVICES

RELATED REFERENCES

This application is a continuation-in-part of U.S. patent application Ser. No. 12/486,743, filed on Jun. 17, 2009, entitled, "Methods and Systems for Power-Controlling Display Devices," and invented by Louis J. Kerofsky.

FIELD OF THE INVENTION

Embodiments of the present invention comprise methods and systems for management and control of power consuming devices with a display device, which is capable of receiving power rate and cost data as well as user preference input. These methods and systems may generate device power consumption schedules based on power rate and cost data and user preference data.

BACKGROUND

Electric power suppliers are burdened with the need to meet extreme peak demands that are many times the average power demand. The requirement of meeting peak electricity demand drives the need for a large portion of power generation capacity. For this reason, shaving or reducing peak demand is of utmost interest to utility providers and energy managers. Peak demand can be mitigated by reducing demand through more efficient use of electricity by consumers during peak demand periods. Peak demand may also be mitigated by time-shifting electricity usage from a peak demand period to an off-peak period.

Early efforts to mitigate peak demand include time or use pricing in which electricity prices are variable based on the time of use or the type of use. Electricity rates that vary based on the time of usage are now common in many areas. Electricity rates that vary based on the type of use, such as business use, residential use, agricultural use, etc., are also common. These type-of-use scenarios are typically implemented by using individual power meters and accounts for specific applications, such as a business location, an irrigation pump or a residential home.

Recent advances in electric power distribution provide the ability for a power distribution network to send data to end-user equipment to help mitigate peak demands. This data may include power pricing data such as current electricity rates. A local user may use this rate data to schedule electricity usage events to take advantage of lower rates. These systems use the market system and the price of power to incentivize to use of power at off-peak times and discourage use during peak demand periods.

SUMMARY

Some embodiments of the present invention comprise methods and systems for using data from a power provider, such as rate or pricing data, to manage power consumption. Some embodiments may automatically adjust usage parameters based on data received from a power provider. Some embodiments may regulate a display device backlight and process image data for the display in response to data received from a power provider. Some embodiments comprise a television or image display device with an interactive interface that displays power provider data to a user and accepts user input for designating power consumption parameters related to the power provider data. Some embodiments may control a plurality of power consuming devices. Some embodiments may also receive television programming data and manage television power consumption in relation to programming content.

The foregoing and other objectives, features, and advantages of the invention will be more readily understood upon consideration of the following detailed description of the invention taken in conjunction with the accompanying drawings.

BRIEF DESCRIPTION OF THE SEVERAL DRAWINGS

DETAILED DESCRIPTION OF EXEMPLARY EMBODIMENTS

Figure 1:
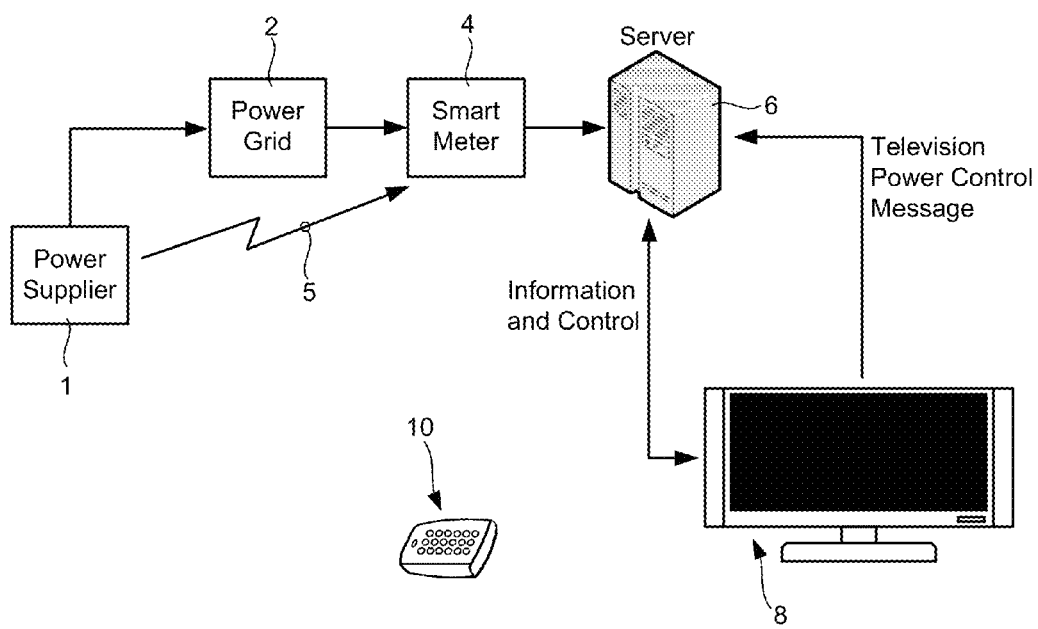
FIG. 1 is a diagram showing an embodiment of the present invention comprising a smart meter, a power management server and a smart television.

Embodiments of the present invention will be best understood by reference to the drawings, wherein like parts are designated by like numerals throughout. The figures listed above are expressly incorporated as part of this detailed description.

It will be readily understood that the components of the present invention, as generally described and illustrated in the figures herein, could be arranged and designed in a wide variety of different configurations. Thus, the following more detailed description of the embodiments of the methods and systems of the present invention is not intended to limit the scope of the invention but it is merely representative of the presently preferred embodiments of the invention.

Elements of embodiments of the present invention may be embodied in hardware, firmware and/or software. While exemplary embodiments revealed herein may only describe one of these forms, it is to be understood that one skilled in the art would be able to effectuate these elements in any of these forms while resting within the scope of the present invention.

Some embodiments of the present invention may comprise elements that are described in the following pending or issued patent applications, which are hereby incorporated herein by reference.

U.S. patent application Ser. No. 11/154,052, entitled "Methods and Systems for Enhancing Display Characteristics," filed on Jun. 15, 2005, published as U.S. publication No. 2006-0284822 on Dec. 21, 2006

U.S. patent application Ser. No. 11/154,053, entitled "Methods and Systems for Enhancing Display Characteristics with High-Frequency Contrast Enhancement," filed on Jun. 15, 2005, published as U.S. publication No. 2006-0284882 on Dec. 21, 2006

U.S. patent application Ser. No. 11/154,054, entitled "Methods and Systems for Enhancing Display Characteristics with Frequency-Specific Gain," filed on Jun. 15, 2005, published as U.S. publication No. 2006-0284823 on Dec. 21, 2006

U.S. patent application Ser. No. 11/224,792, entitled "Methods and Systems for Image-Specific Tone Scale Adjustment and Light-Source Control," filed on Sep. 12, 2005, published as U.S. publication No. 2006-0119612 on Jun. 8, 2006

U.S. patent application Ser. No. 11/202,903, entitled "Methods and Systems for Independent View Adjustment in Multiple-View Displays," filed on Aug. 8, 2005, published as U.S. publication No. 2007-0035565 on Feb. 15, 2007

U.S. patent application Ser. No. 11/371,466, entitled "Methods and Systems for Enhancing Display Characteristics with Ambient Illumination Input," filed on Mar. 8, 2006, published as U.S. publication No. 2007-0211049 on Sep. 13, 2007

U.S. patent application Ser. No. 11/293,562, entitled "Methods and Systems for Determining a Display Light Source Adjustment," filed on Dec. 2, 2005, published as U.S. publication No. 2006-0209003 on Sep. 21, 2006

U.S. patent application Ser. No. 11/293,066, entitled "Methods and Systems for Display Mode Dependent Brightness Preservation," filed on Dec. 2, 2005, published as U.S. publication No. 2006-0119613 on Jun. 8, 2006

U.S. patent application Ser. No. 11/460,768, entitled "Methods and Systems for Distortion-Related Source Light Management," filed on Jul. 28, 2006, published as U.S. publication No. 2006-0262111 on Nov. 1, 2007

U.S. patent application Ser. No. 11/460,907, entitled "Methods and Systems for Generating and Applying Image Tone Scale Corrections," filed on Jul. 28, 2006, published as U.S. publication No. 2006-0267923 on Nov. 30, 2006

U.S. patent application Ser. No. 11/460,940, entitled "Methods and Systems for Color Preservation with Image Tonescale Corrections," filed on Jul. 28, 2006, published as U.S. publication No. 2008-0024517 on Jan. 31, 2008, issued as U.S. Pat. No. 7,515,160 on Apr. 7, 2009

U.S. patent application Ser. No. 11/465,436, entitled "Methods and Systems for Selecting a Display Source Light Illumination Level," filed on Aug. 17, 2006, published as U.S. publication No. 2006-0274026 on Dec. 7, 2006

U.S. patent application Ser. No. 11/564,203, entitled "Methods and Systems for Image Tonescale Adjustment to Compensate for a Reduced Source Light Power Level," filed on Nov. 28, 2006, published as U.S. publication No. 2007-0092139 on Apr. 26, 2007

U.S. patent application Ser. No. 11/680,312, entitled "Methods and Systems for Brightness Preservation Using a Smoothed Gain Image," filed on Feb. 28, 2007, published as U.S. publication No. 2007-0146236 on Jun. 28, 2007

U.S. patent application Ser. No. 11/680,539, entitled "Methods and Systems for Surround-Specific Display Modeling," filed on Feb. 28, 2007, published as U.S. publication No. 2008-0208551 on Aug. 28, 2008

U.S. patent application Ser. No. 11/845,651, entitled "Methods and Systems for Tone Curve Generation, Selection and Application," filed on Aug. 27, 2007, published as U.S. publication No. 2007-0291048 on Dec. 20, 2007

U.S. patent application Ser. No. 11/929,796, entitled "Methods and Systems for Backlight Modulation and Brightness Preservation," filed on Oct. 30, 2007, published as U.S. publication No. 2009-0109232 on Apr. 30, 2009

U.S. patent application Ser. No. 11/929,918, entitled "Methods and Systems for Image Enhancement," filed on Oct. 30, 2007, published as U.S. publication No. 2009-0109233 on Apr. 30, 2009

U.S. patent application Ser. No. 11/948,969, entitled "Methods and Systems for Weighted-Error-Vector-Based Source Light Selection," filed on Nov. 30, 2007, published as U.S. publication No. 2009-0140970 on Jun. 4, 2009

U.S. patent application Ser. No. 11/948,978, entitled "Methods and Systems for Backlight Modulation with Scene-Cut Detection," filed on Nov. 30, 2007, published as U.S. publication No. 2009-0141178 on Jun. 4, 2009

U.S. patent application Ser. No. 11/964,674, entitled "Methods and Systems for Display Source Light Illumination Level Selection," filed on Dec. 26, 2007

U.S. patent application Ser. No. 11/964,683, entitled "Methods and Systems for Backlight Modulation with Image Characteristic Mapping," filed on Dec. 26, 2007

U.S. patent application Ser. No. 11/964,689, entitled "Methods and Systems for Display Source Light Management with Histogram Manipulation," filed on Dec. 26, 2007

U.S. patent application Ser. No. 11/964,691, entitled "Methods and Systems for Image Tonescale Design," filed on Dec. 26, 2007

U.S. patent application Ser. No. 11/964,695, entitled "Methods and Systems for Display Source Light Management with Variable Delay," filed on Dec. 26, 2007

U.S. patent application Ser. No. 12/111,113, entitled "Methods and Systems for Image Compensation for Ambient Conditions," filed on Apr. 28, 2008

U.S. patent application Ser. No. 12/202,243, entitled "Methods and Systems for Display Source Light Management with Rate Change Control," filed on Aug. 30, 2008

Some embodiments of the present invention may comprise a television connected to a smart meter. A television has several distinct aspects compared to a generic home appliance. Among these are: the ability to display information to a user, power/quality scalability, widely varied power consumption depending upon video content being displayed, and a limited ability to time shift its use. These distinct aspects both limit the conventional load time shift approaches to peak shaving power reduction and provide additional approaches to peak shaving.

In some embodiments, a television can be used to display information from a smart meter regarding power grid alerts, current and price history and usage statistics. A television or display of some embodiments may be used with remote modules connected to electrical sockets or other appliances. These remote modules may report back to the master display device regarding energy consumption of the devices to which they are connected. The master display device, which may also have processing capacity, may then adjust performance parameters for the devices attached to the remote reporting modules. These adjustments can help reduce energy use and/or change device performance. In some embodiments, remote modules may measure how much energy a single product or a group of products uses, and then send the data to a computer for analysis. In some embodiments, the computer may be part of the master display device or may be a separate computer that is networked with a master display device. In an exemplary embodiment, a remote module can help determine how much it costs to run a refrigerator. In some embodiments, a remote module can also determine how much energy your television or computer uses in Sleep mode—information that just might cause you to shut those products off more often." The master display device can display this information and provide signals back to a server to help a consumer make informed energy use decisions.

In some embodiments, a display device, such as a smart television, may be equipped with a power control algorithm, which may limit the average power use independent of display content. In some embodiments, there may be two interacting aspects involved in this process.

First, determining a power target in terms of a bound on average power based upon the state of a power grid or power cost factors, which may be supplied by a power provider or another party. This determination may take place on a server having access to both power rate data and the television. This determination may also take place on a smart television with processing capabilities and access to the power rate data.

Second, one or more algorithms which guarantee this power target is met while providing minimal impact to the viewer. To meet a power consumption target, the television can gracefully degrade image brightness, quality or size as power is reduced. In some embodiments, this power consumption adjustment may be achieved by adjusting the display backlight brightness. This simple method degrades brightness in exchange for power. Some embodiments of the present invention may use more advanced cost functions for deciding how much brightness or other image aspects, such as highlight detail, to reduce in exchange for a power reduction. In some embodiments, parameters considered in this decision may comprise the properties of the display, the image content, and the viewing conditions (e.g., ambient lighting).

The systems and methods of some embodiments of the present invention may be described with reference to FIG. 1. These embodiments may receive power from a power supplier 1, such as a utility company, which distributes power over a transmission medium 2, such as a power grid. These embodiments may comprise a smart meter 4, which may be connected to the incoming power transmission medium 2 so as to measure current, voltage and other aspects of the power as it is supplied to a home, business or other entity. The smart meter 4 may also be in communication with a power supplier 1 and may receive power rate or cost data from the power supplier 1 over a communication link 5, such as a wireless network connection, a cellular phone connection, a radio connection, a telephone connection, a wired communication connection or some other communication connection suitable for transmitting data between computing devices.

The smart meter 4 may also be connected to power management server 6, which may comprise only simple communication and computing resources or more extensive resources, such as multiple processors and storage devices. The power management server 6 may also be in communication with a smart television or display device 8. In some embodiments, the power management server 6 may communicate power usage and power rate data to the television 8. In some embodiments, the power management server 6 may communicate a power control signal to the television or display 8. This power control signal may serve to regulate the backlight and/or other parameters of the display 8 to regulate power consumption. In response to the regulation of the backlight and other parameters, the television or display 8 may modify displayed content to compensate for a reduced backlight level or some other adjustment. Many methods for modification of displayed image content are described in the patent applications that are incorporated herein by reference at the beginning of this detailed description.

In some embodiments, the electric utility 1 may communicate power grid events including power control events and real-time pricing information to the smart meter 4. In some embodiments, a power control event may comprise an indication of a peak demand period or an indication of some change in demand. In some embodiments, a power control event notification may be sent or received periodically when power demand changes occur or when a change in power consumption may benefit a power consumer, the community or the environment. In some embodiments, a power control event may be unrelated to the cost of power and/or may be based on environmental factors or other policy factors. The smart meter 4 may communicate this information to the power management server 6. The power management server 6 may then send information to the television 8 to perform different tasks. For example, in some embodiments, the power management server 6 may send data for displaying messages or information on the television such as for enabling the user to make power management decisions and selections. The power management server 6 may also send data to the television for managing television power consumption. For power management purposes, the television 8 may respond automatically to commands from the power management server 6 to reduce power consumption. In some cases, these responses may come at the expense of image brightness and/or image quality. However, in some cases, the power management server 6 or the television 8 may compensate the displayed image to compensate for a reduced power level. This compensation may result in an image being displayed at a reduced power level, but which is not perceptibly different than an image displayed at full power settings.

It should be noted that, in some embodiments, smart meter 4, power management server 6 and television or display 8 may be integrated into one or more devices that perform all the functions of the separate devices. In some embodiments, a remote control 10 may also be used to perform typical television control functions as well as to receive user input relative to power consumption options that may be displayed on the television 8. In some embodiments, a remote control device 10 may also communicate with smart meter 4 and/or power management server 6. A remote control 10 or embodiments of the present invention may communicate using wireless RF signals, wireless infrared signals, wired communication processes or by other communication methods.

Figure 2:
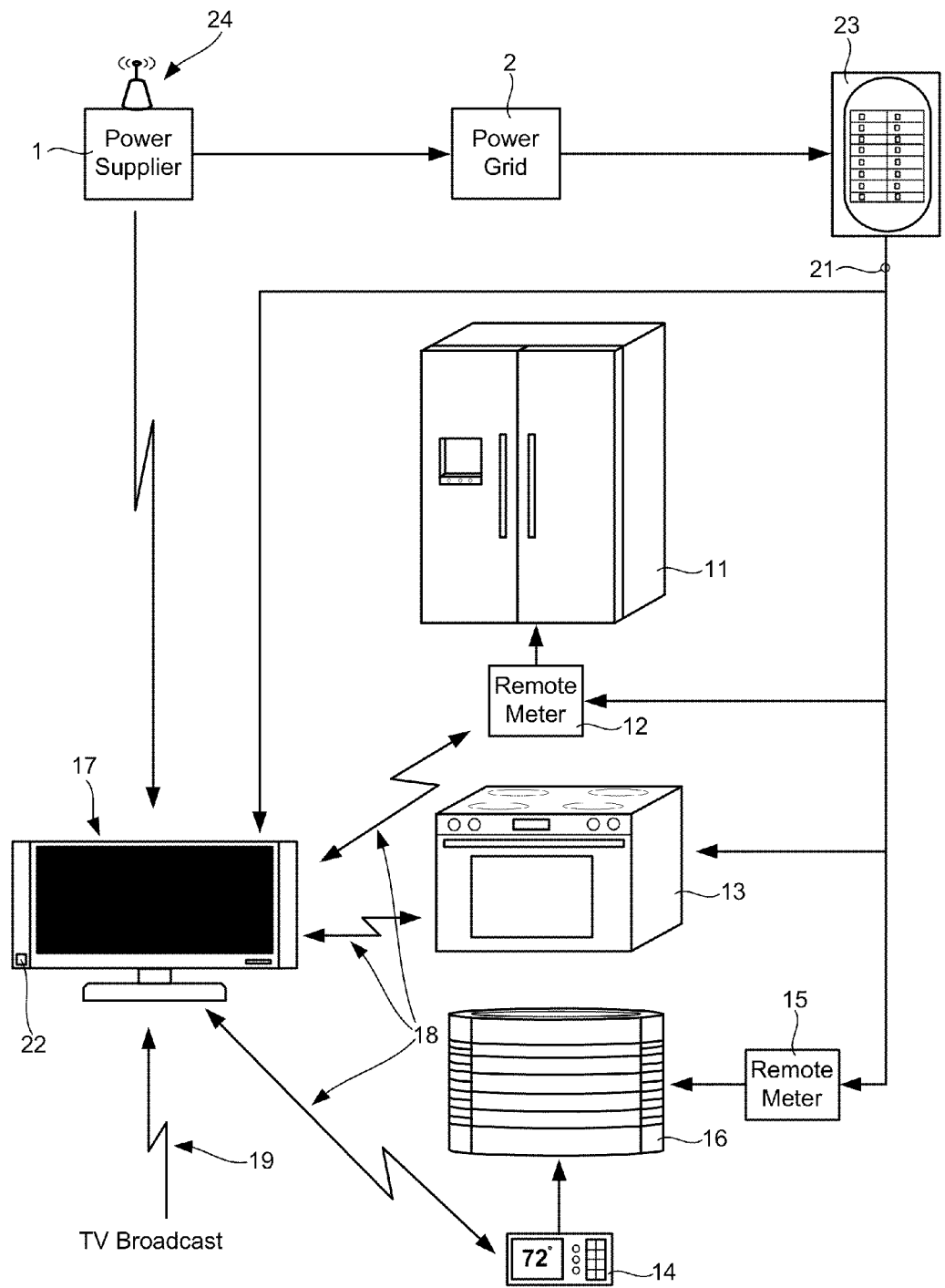
FIG. 2 is a diagram showing an embodiment of the present invention comprising a master power control display device and connected power consuming devices.

Some embodiments of the present invention may be described with reference to FIG. 2. In these embodiments, power is provided by a power provider, such as a utility company 1 through an electrical transmission grid 2 to a point of entry 23 into a metered use area, such a residence or business location. A point of entry may comprise an electrical meter or shut-off switch, however, in these embodiments, the meter or point of entry does not need to communicate or process information. Beyond the meter or point of entry 23, private transmission lines, such as electrical wiring 21, typically carry power to various appliances and end uses, such as a refrigerator 11, air conditioning unit 16, oven 13, television 17 and other devices.

In some embodiments, this electrical wiring 21 may terminate in a power monitoring unit (PMU), which may reside in an appliance, such as television 17 or oven 13. A PMU may also reside in an electrical receptacle 12, an electrical junction box or breaker box 15. A PMU may also reside in a thermostat 14 or some other form of remote control device. A PMU may measure electrical attributes related to the current, voltage, phase and/or other electrical attributes for the device to which the PMU is connected. In some embodiments, a PMU may also calculate values, such as power, energy and other values related to electricity use or consumption.

In some embodiments, attributes measured by the PMU and any values calculated by the PMU may be transmitted to a Master Power Control and Display Device (MPCDD) 17, which may comprise a television tuner 22. The MPCDD 17 may receive data from the PMUs and process that data to determine power consumption characteristics of each device 11, 13, 15 as well as cumulative characteristics and global characteristics for a group of devices. In some embodiments, an MPCDD 17 may also determine energy usage and consumption characteristics for one or more parts of the MPCDD 17, such as the television display components (e.g., backlight, pixel arrays, etc.), audio components or other parts of the device. In some embodiments, an MPCDD 17 may generate and transmit power control messages to connected PMUs thereby controlling the power consumption of the attached devices 11, 13, 15, 17.

In some embodiments, an MPCDD 17 may receive power rate and cost data from a power supplier, such as a utility company. In some embodiments, an MPCDD 17 may alternatively or additionally receive notification of a power control event. In some embodiments, a power control event may comprise an indication of a peak demand period or an indication of some change in demand. In some embodiments, a power control event notification may be sent or received periodically when power demand changes occur or when a change in power consumption may benefit a power consumer, the community or the environment. In some embodiments, a power control event may be unrelated to the cost of power and/or may be based on environmental factors or other policy factors.

In some embodiments, power rate and cost data and/or a power control event notification may be received via a data communication network, such as a wireless network. For example, an MPCDD 17 may comprise a wireless network interface controller, which interfaces using the IEEE 802.11 standard, a Bluetooth standard or some other wireless network standard and associated protocols. In some embodiments, an MPCDD 17 may comprise a wired network controller or modem and communicate with a power supplier using a wired network standard and protocol over a wired network or phone line.

In some embodiments, an MPCDD 17 may receive power rate and cost data and/or a power control event via a television channel by receiving a signal 19 through a television tuner 22. In these embodiments, a television broadcast may comprise power rate and cost data and may include various times for rate changes. The power rate and cost data may be used by the MPCDD 17 to determine power management parameters for regulating any devices connected through PMUs. An MPCDD 17, may user power rate and cost data and/or a power control event to determine a power consumption schedule that may limit device power consumption for specific periods. In some embodiments, the timing of the power rate changes may be used to schedule efficient consumption. In an exemplary power consumption schedule, heating and/or cooling devices, such as refrigerator 11 and AC unit 16 may be scheduled or programmed to cool below a normal thermostatically-controlled level during a period just prior to a power rate increase so as to use less energy during the increased rate period. Similarly, a cooling device 11, 16 may be scheduled or programmed to allow a higher than normal thermostatically-controlled level during a period just prior to a rate decrease so as to delay significant cooling until after the rate decrease.

Similarly, for heating devices, an exemplary power consumption schedule may cause heating devices to heat to a level above a thermostatically-controlled level for a period just prior to a power rate increase and may cause heating devices to delay heating to a thermostatically-controlled level for a period just prior to a power rate decrease so as to delay a significant amount of heating until after the rate decrease.

In some embodiments, an MPCDD 17 may communicate directly with a thermostat, such as thermostat 14, to control a thermostatically-controlled device. In other embodiments, an MPCDD 17 may communicate directly with devices, such as AC unit 16, refrigerator 11 and oven 13 to control those devices.

In some embodiments, an MPCDD 17 may receive a power rate and cost data and/or a power control event notification via an RF television frequency broadcast. In some embodiments, an MPCDD 17 may receive power rate and cost data via a cable television connection. In some embodiments, a power supplier or utility 1 may broadcast 24 power rate and cost data at specific intervals or in real time. In some embodiments, a power supplier 1 may broadcast or transmit a signal with data that identifies the power supplier, the times of any rate changes and the rates that apply for each time period. In some cases, rates may be identified for different classes of users (e.g., business or residential) or different usage or consumption categories such as when rates change based on the quantity of energy used. In some cases, specific instructions may be generated for peak demand periods.

In some embodiments, power rate and cost data from the power supplier may comprise commands that are recognizable to the MPCDD 17 that may cause the MPCDD 17 to control specific devices under control of the MPCDD 17. For example, a user may set preferences in his/her MPCDD 17 to allow a power supplier to control specific devices via a signal received by the MPCDD 17 from the power supplier. In some cases, the power supplier may direct an MPCDD 17 to shut down specific devices during a peak demand period. In some cases, a power supplier may direct an MPCDD 17 to adjust settings on specific devices, such as adjusting a temperature setting on a thermostat during specific periods (e.g., during a peak demand period). In some cases, a user may program an MPCDD 17 to prevent or adjust all or some of the commands from the power supplier.

In some embodiments, an MPCDD 17 may use power rate and cost data, derived from the television signal, to generate a power schedule for various devices in communication with the MPCDD 17. An MPCDD 17 may also display information derived from the power supplier's power rate and cost data to a user and prompt for user input to acquire user preferences. User preference data may be specific to each device, each group of devices or global preferences for all devices controlled by an MPCDD 17. User preference data may also comprise instructions that are conditional in relation to power cost at a specific time. For example, a user may select preferences that instruct the MPCDD 17 to activate specific devices only when the power cost is below a specified level. A user may also specify preferences indicating that specific devices may not be activated during peak demand periods identified in the power rate and cost data received from the power supplier 1.

In some embodiments, an MPCDD 17 may also receive television programming content via a television channel or other communication link. An MPCDD 17 may also receive user preference input relative to the television programming content and the power cost data. An MPCDD 17 may then use the user preference input, the power rate and cost data and the television programming schedule to generate a power consumption schedule, which may comprise a power budget that is responsive to a user's preferred television programming. For example, an exemplary power consumption schedule may automatically adjust the power consumption of other devices so that a television may operate at full power during preferred programming that occurs during a peak demand or power budget period.

Figure 3:
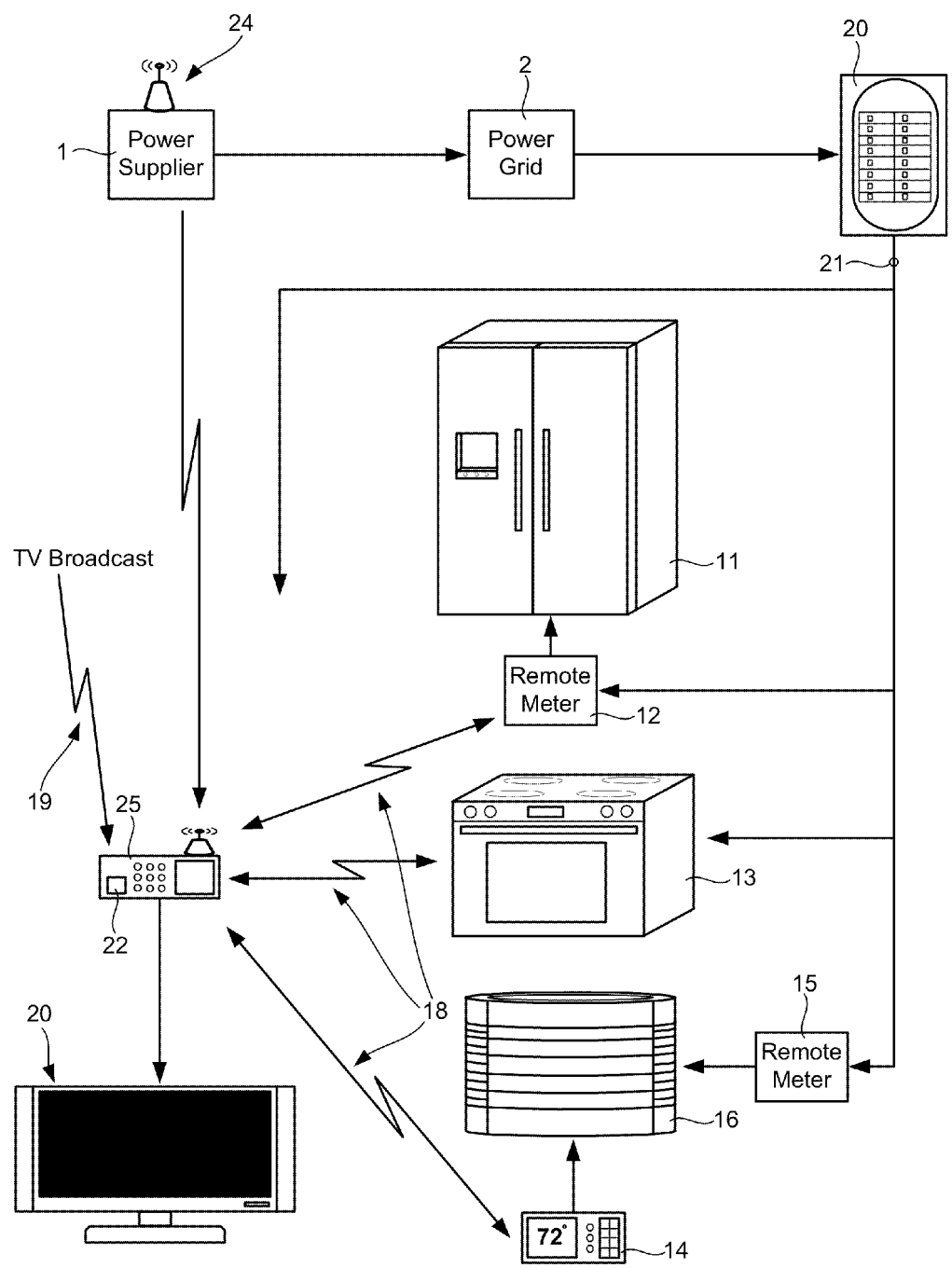
FIG. 3 is a diagram showing an embodiment of the present invention comprising a master power control set-top box, a television and connected power consuming devices.

Some embodiments of the present invention may be described with reference to FIG. 3. These embodiments comprise a master power control set-top box (MPCSTB) 25, which may receive and transmit signals 18 to PMUs and other power-controlled devices. An MPCSTB 25 may also communicate via a television signal 19, such as a television broadcast channel, a cable television signal or some other analog or digital television broadcast medium. An MPCSTB 25 is also typically connected to a display device, such as a television 20. An MPCSTB 25 may also comprise a television tuner 22.

In some embodiments, an MPCSTB 25 performs essentially the same functions as an MPCDD 17 or a PCDD 56 (described below) except the communication and processing functions are housed in a set-top box rather than being integral with the display device. An MPCSTB 25 may receive power rate and cost data, which may comprise a power cost schedule, from a power supplier. This power rate and cost data may be received directly from a power supplier, via a television broadcast or by other methods. This data may then be displayed to a user on a connected display 20, which may be a power-controlled display device with power control and image compensation components. In some embodiments, an MPCSTB 25 may comprise image compensation components (as explained below and in patent applications incorporated by reference) and the display 20 may only comprise a backlight control interface that may be accessed by the MPCSTB 25.

Display with Internal Power Management

In some embodiments of the present invention, a television or display device may comprise internal power management functions as well as power-related messaging display functions, which may relate to power consumption of the display device or other devices in communication with the display device. In some embodiments, the display device may comprise an MPCDD 17.

In some embodiments, the television or display may provide the ability to display information to a consumer as well as the ability for a user to provide feedback to the system via the television user interface or remote control. These features may be independent of regulating television power consumption.

Figure 4:
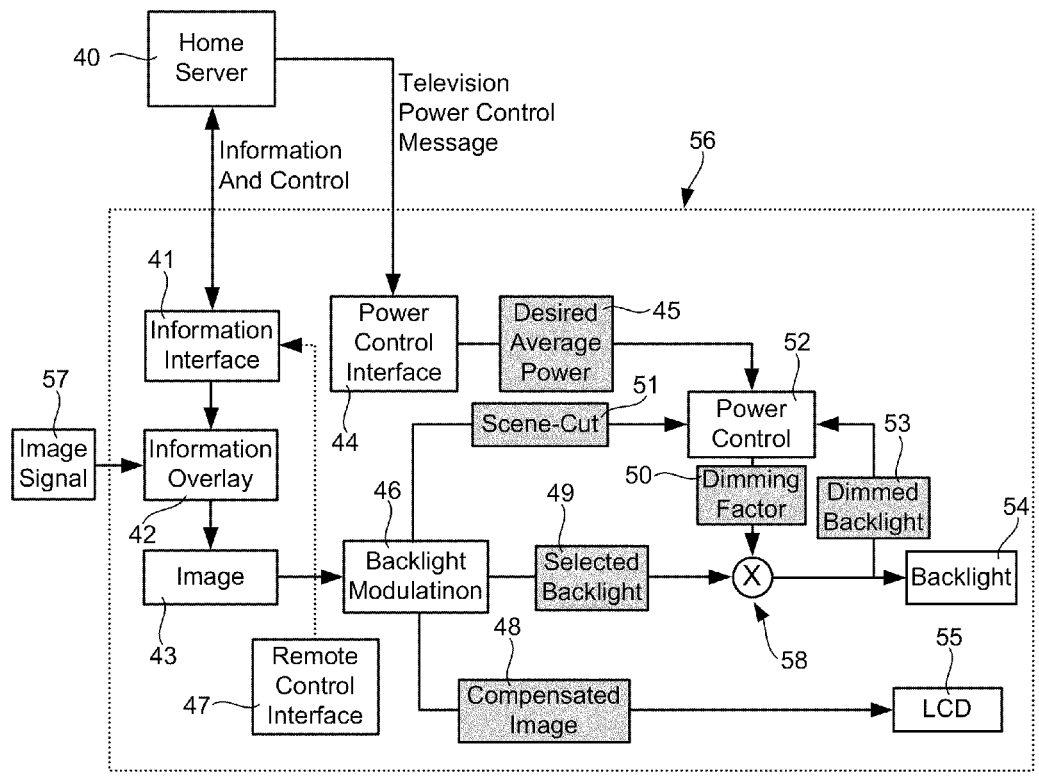
FIG. 4 is a diagram showing an embodiment of the present invention comprising a power-controlled display device.

In some embodiments, the television or display device can display several types of information relevant to power consumption:

Recent and current state of power grid
  Current and historical price of electricity
  Alert messages from the power grid operator/power supplier
  Power consumption information from the home server or MPCDD 17 such as status and schedule of appliances in home The user can interact with the power management process of the home server using the television remote control as an input device and the display for visual feedback. Exemplary actions enabled through display or television controls comprise:

Setting device priorities in power management system
  Overriding system power control decisions Some embodiments of the present invention may be described with reference to FIG. 4. These embodiments comprise a power-controllable display device (PCDD) 56 in which the power consumption of the display itself may be internally adjusted or varied in response to power rate and cost data as well as display content and other parameters.

In some embodiments, a PCDD 56 may be connected to a power control server 40, which may receive power rate and cost data via various communication networks, such as a wireless network connection, a wired network connection, a telephone line, a powerline network connection, an RF connection, an IR connection, a television channel or other communication connections. In some embodiments, a power control server 40 may be an integral element of the PCDD 56. In some embodiments, the power control server 40 may process power rate and cost data as well as user preference data and may generate control data for controlling elements of the PCDD, such as backlight and pixel values and/or for controlling other devices such as any devices with PMUs or other control-enabling devices. In some embodiments these processing functions may be performed by processing elements in a PCDD 56 or MPCDD 17.

In some embodiments, a PCDD 56 may also comprise an information interface 41 for receiving information to be displayed on the PCDD 56 display. This information may be received from the power control server 40, from a remote control interface 47, from other elements of the PCDD (e.g., manual controls on TV, ambient sensors, display content), from PMUs or from other input elements. An information interface 41 may process and format data for display on the PCDD 56 display for consumption by users. Information received or generated at the information interface 41 may then be sent to an information overlay module 41, where the information may be formatted for direct display without a background image or for integration with another image. In some embodiments, the information overlay module 42 may also receive image data 57 which defines an image to be combined with the information overlay. The information-modified image 43, which may comprise information overlay data may then be sent to a backlight modulation module 46 for modification related to backlight changes.

Some embodiments may comprise a remote control interface 47 for receiving user input from a user. In some embodiments, information may be displayed on the display of the PCDD 56 to prompt input from a user. In an exemplary embodiment, a PCDD 56 may prompt for user preferences related to power consumption, television or display content, power rate and cost data and other factors. Input received from the user via the remote control interface 47 may be forwarded to the information interface 41 and on to the power control server 40, an equivalent component in the PCDD and/or other PCDD 56 components.

Embodiments of the present invention may also comprise a power control interface 44 for receiving power control messages or commands from a power control server 40 or an equivalent internal component of the PCDD 56. A power control interface 44 may receive a power control command and interpret or process that command into a control signal for controlling the power consumption of the PCDD 56. In some embodiments, the power control signal generated by the power control interface 44 may define a backlight illumination level. In other embodiments, the power control signal may define a target power parameter, such as a desired average power 45, which may instruct a power control module 52 to set a specific power or illumination level or to select a specific algorithm for modulating backlight power or another power parameter.

In some embodiments, a power control module 52 may receive input from a backlight modulation module 46, which may provide image content data such as an average pixel level, histogram data, maximum pixel level, minimum pixel level and many other image content-related parameters. In some embodiments, a backlight modulation module 46 may provide scene cut data 51 to a power control module 52, however other embodiments may not use this feature.

In some embodiments, the backlight modulation module 46 may receive image data, which may or may not have been altered by the information overlay module 42. This image data will typically comprise image content data, such as pixel values, and may also comprise metadata that describes image content and format data as well as image source, creator, capture and other data. The backlight modulation module 46 may receive image data and analyze or process the image data to determine a selected backlight level 49. In some cases, a selected backlight level 49 may be determined independently of any image data. Once a backlight level is determined, image data may be compensated for non-standard, non-maximum or other backlight changes. Exemplary embodiments of this image compensation are described in the patent applications that are incorporated herein by reference. This compensated image 48 may then be sent to the LCD panel for display.

In some embodiments, a backlight modulation module 46 may provide the selected backlight level signal 49 to the power control module 52, which may modify 58 the selected backlight level based on power control parameters. In some cases, the modified backlight signal 53 may be fed back to the power control module 52 as well as being sent to the backlight control 54 for use when displaying the compensated image 48 on LCD 55.

It should be noted that power rate and cost data received by the power control interface 44 may be used along with user preferences received from the remote control interface 47, or from other input, to create a power control schedule or power control rule set for governing power within PCDD 56 and any other devices connected to the PCDD 56. In some embodiments, an MPCDD 17 may comprise a PCDD 56 and may control a plurality of external devices that are connected via PMUs or via similar connections.

In some embodiments, a PCDD 56 may vary internal backlight levels and other power consumption levels based on power rate and cost data, which may define peak power demand periods, power rate changes, and power discount periods and other cost-related power data. In some embodiments, an MPCDD 17 or a PCDD 56 may also receive regulatory data comprising utility regulations, governmental regulations and other regulations that may be mandatory or voluntary. In some embodiments, a notification of a power control event may be sent to an MPCDD 17 or a PCDD 56. In some embodiments, a power control event may comprise an indication of a peak demand period or an indication of some change in demand. In some embodiments, a power control event notification may be sent or received periodically when power demand changes occur or when a change in power consumption may benefit a power consumer, the community or the environment. In some embodiments, a power control event may be unrelated to the cost of power and/or may be based on environmental factors or other policy factors. In some embodiments, user preferences may be set to prescribe automated power control actions, such as backlight control or device power control actions. Regulatory data may be received via a television channel over a cable or RF connection. Regulatory data may also be received via a wireless or wired network connection just as power rate and cost data may be received.

In some embodiments, an exemplary power control algorithm for adaptively dimming a display to meet an average power target without over dimming the display may be used. In some embodiments, the power control module adjusts the maximum BL to achieve the desired target average power. The initial power consumption rate may be set greater than the target; the power control may then scale the selected backlight to reduce the power consumption toward the target. The rate of change of the scaling may be limited to make changes in brightness visually unnoticeable.

Figure 5:
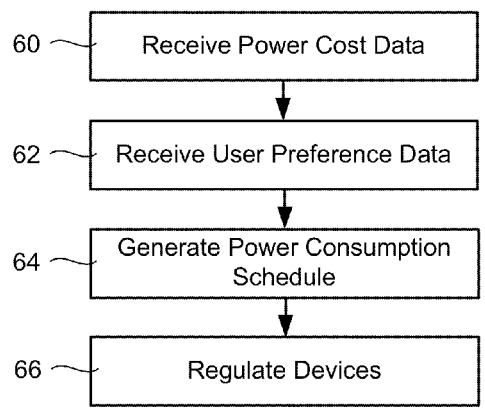
FIG. 5 is a diagram showing an exemplary embodiment wherein a power consumption schedule is generated based on power cost data and user preference data.

Some embodiments of the present invention may be described with reference to FIG. 5. In these embodiments, a power control and display device, such as an MPCDD 17, a PCDD 56 or an MPCSTB 25, may receive 60 power cost data. Power cost data may comprise power rate and cost data including, but not limited to starting and beginning times of time periods of varying power cost. This data may be received from a direct connection, a wired or wireless network connection, a television channel broadcast or by other communication methods.

The power control and display device of these embodiments may also receive 62 user preference data related to power consumption during periods identified in the power cost data. User preference data may be received 62 via a remote control device in communication with the power control and display device or by other communication methods.

Based on the power cost data and the user preference data, the power control and display device may generate 64 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 66 power consumption of connected devices or internal components or they may be sent directly to connected devices with processing components that read the power control commands to regulate 66 power consumption.

Figure 6:
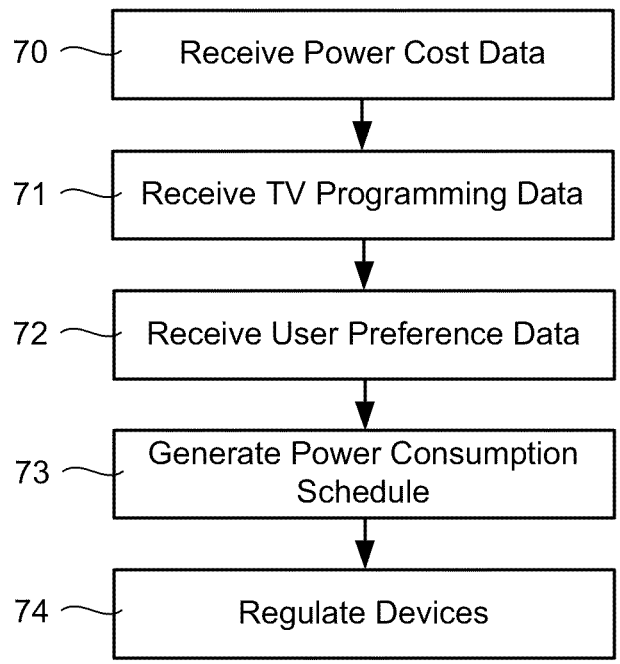
FIG. 6 is a diagram showing an exemplary embodiment wherein a power consumption schedule is generated based on power cost data, television programming data and user preference data.

Some embodiments of the present invention may be described with reference to FIG. 6. In these embodiments, a power control and display device, such as an MPCDD 17, a PCDD 56 or an MPCSTB 25, may receive 70 power cost data. Power cost data may comprise power rate and cost data including, but not limited to starting and beginning times of time periods of varying power cost. This data may be received from a direct connection, a wired or wireless network connection, a television channel broadcast or by other communication methods.

In these embodiments, a power control and display device may also receive 71 television programming data, which may comprise a schedule of the content being broadcast at various times on various channels.

The power control and display device of these embodiments may also receive 72 user preference data related to power consumption during periods identified in the power cost data. User preference data may also comprise information regarding user preferences related to the television programming data. User preference data may be received 72 via a remote control device in communication with the power control and display device or by other communication methods.

Based on the power cost data, the television programming data and the user preference data, the power control and display device may generate 73 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 74 power consumption of connected devices or internal components or they may be sent directly to connected devices with processing components that read the power control commands to regulate 74 power consumption.

Figure 7:
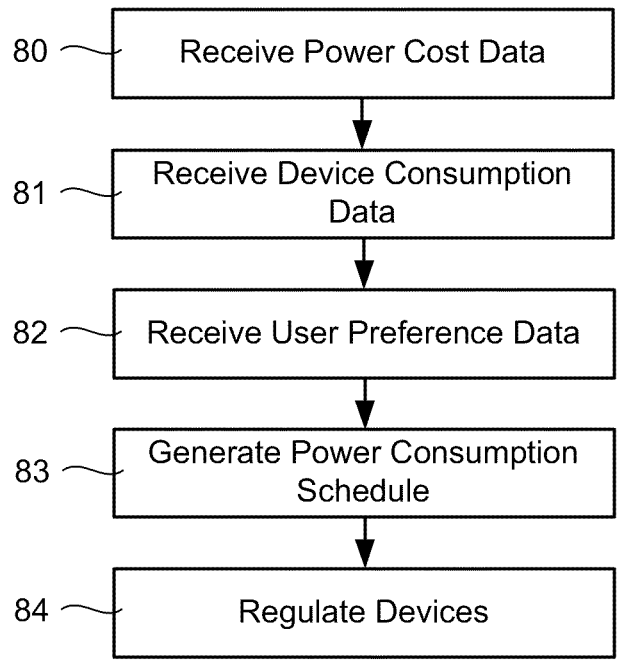
FIG. 7 is a diagram showing an exemplary embodiment wherein a power consumption schedule is generated based on power cost data, device consumption data and user preference data.

Some embodiments of the present invention may be described with reference to FIG. 7. In these embodiments, a power control and display device, such as an MPCDD 17, a PCDD 56 or an MPCSTB 25, may receive 80 power cost data. Power cost data may comprise power rate and cost data including, but not limited to starting and beginning times of time periods of varying power cost. This data may be received from a direct connection, a wired or wireless network connection, a television channel broadcast or by other communication methods.

In these embodiments, a power control and display device may also receive 81 device power consumption data, which may comprise a history of power consumption by connected devices, a list of power consumption by connected devices for various activities or other power consumption information.

The power control and display device of these embodiments may also receive 82 user preference data related to power consumption during periods identified in the power cost data. User preference data may also comprise information regarding user preferences related to the device power consumption. User preference data may be received 82 via a remote control device in communication with the power control and display device or by other communication methods.

Based on the power cost data, the television programming data and the user preference data, the power control and display device may generate 83 a power consumption schedule. A power consumption schedule may comprise power control commands for controlling any power consuming devices in communication with the power control and display device. A power consumption schedule may also comprise power control commands for controlling internal components of the power control and display device, such as a display backlight and accompanying image compensation components. These power control commands may be used internally to generate signals to regulate 84 power consumption of connected devices or internal components or they may be sent directly to connected devices with processing components that read the power control commands to regulate 84 power consumption.

Figure 8:
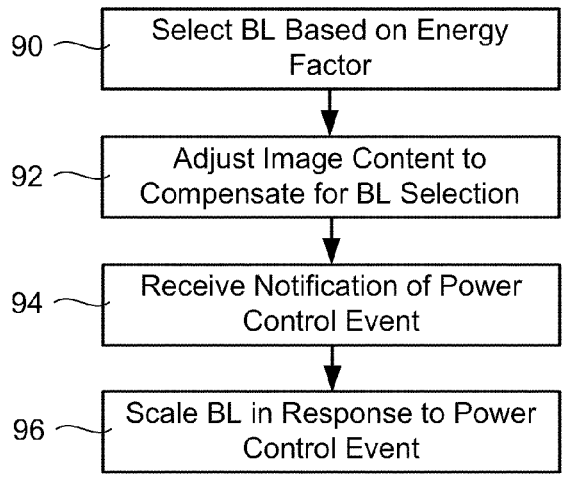
FIG. 8 is a chart showing the steps of a method comprising scaling a display backlight in response to a power control event.

Some embodiments of the present invention may be described with reference to FIG. 8. In these embodiments, a smart meter 4 may receive a power control event notification and communicate the receipt of this notification to a display device. Alternatively, a power-controlled display device (PCDD) 56 or a master power control display device (MPCDD) 17 may receive a power control event notification. In some embodiments, a power control event notification may comprise an indication of a peak demand period or an indication of some change in demand. In some embodiments, a power control event notification may be sent or received periodically when power demand changes occur or when a change in power consumption may benefit a power consumer, the community or the environment. In some embodiments, a power control event may be unrelated to the cost of power and/or may be based on environmental factors or other policy factors. In some embodiments, a power control event notification may be a simple message indicating the occurrence of a power control event. Whether the notification is received directly by the smart meter 4 or a smart display device 17, 56, the message is forwarded to a smart display such as an MPCDD 17 or a PCDD 56.

In these embodiments, the MPCDD 17 or the PCDD 56 will select 90 a backlight level based on one or more energy factors or other factors. The image content may then be adjusted 92 to compensate for the backlight selection. In most instances, the backlight selection will be lower than a maximum level in order to reduce energy consumption. Image compensation may comprise the application of a tone scale adjustment curve to preserve the brightness of the image while being displayed with the reduced backlight level. Various methods for performing this compensation are explained above and in references incorporated herein by reference. The power control event notification may then be received 94 at the display device and the selected backlight level may be scaled or adjusted 96 in response to the power control event. In some embodiments, the power control event notification may indicate the occurrence of a peak demand period or some other demand condition. In some embodiments, the display may scale 96 the backlight selection to a lower level in response to a notification that a peak demand period or increased demand period has begun.

Figure 9:
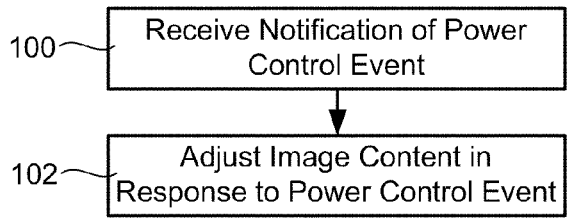
FIG. 9 is a chart showing the steps of a method comprising adjusting image content in response to a power control event.

Some embodiments may be described with reference to FIG. 9. In these embodiments, the MPCDD 17 or PCDD 56 may comprise a display with individual light-emitting pixels, such as an LED or an OLED device. These display devices may not have a backlight that can be manipulated, however, the image code values may be manipulated or adjusted to "brighten" an image or to "dim" an image for reduced power consumption. Image compensation techniques described above and in applications incorporated herein by reference may be used to adjust image code values in response to a notification of a power control event. In some embodiments, a smart meter 4 may receive 100 a notification of a power control event and interpret and/or forward the notification to a display device. In some embodiments, the power control event notification may be received 100 directly at an MPCDD 17 or a PCDD 56. In response to receiving the notification at the display 17, 56, image content may be adjusted 102 by brightening or dimming the image code values to effect energy consumption changes or other effects.

Figure 10:
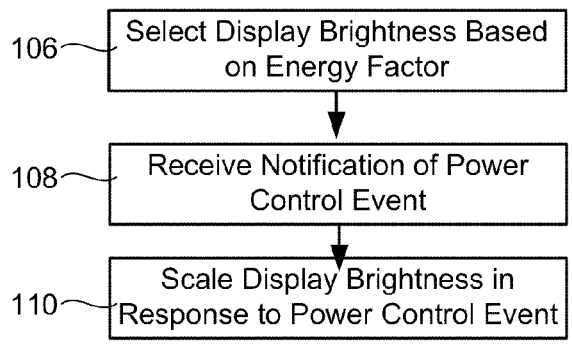
FIG. 10 is a chart showing the steps of a method comprising scaling display brightness in response to a power control event.

Some embodiments of the present invention may be described with reference to FIG. 10. In these embodiments, a display brightness factor may be selected 106 based on an energy factor or some other factor. As in other embodiments, the notification of a power control event may also be received 108 either directly at an MPCDD 17 or a PCDD 56 or via a smart meter 4. In response to receiving the notification, the display brightness factor may be scaled or adjusted 110 to account for the power control event. In some embodiments, the display brightness may be reduced in order to reduce power consumption when a peak demand period is indicated in the power control event notification.

The terms and expressions which have been employed in the foregoing specification are used therein as terms of description and not of limitation, and there is no intention in the use of such terms and expressions of excluding equivalence of the features shown and described or portions thereof, it being recognized that the scope of the invention is defined and limited only by the claims which follow.

What is claimed is:

1. A method for regulating power consumption with a power-controllable display device (PCDD), said method comprising:
    a) selecting a backlight level for said PCDD, wherein said selecting is based on efficient power consumption, and wherein said PCDD comprises a processor and a memory and wherein said PCDD is connected to an external power source managed by a power supplier charging a fee for power received from said external power source based on a variable rate;
    b) adjusting image content to be displayed by using said backlight level so as to compensate for said backlight level;
    c) receiving a notification of a power control event at said PCDD, wherein said notification is received from said power supplier and said power control event relates to said variable rate; and
    d) automatically, without manual input, scaling said backlight level in response to said power control event.

2. The method as described in claim 1 further comprising:
    a) prompting a user for user preference data related to power consumption by displaying a prompt on a display of said PCDD;
    b) receiving user preference data related to power consumption at said PCDD via a remote control device that controls said PCDD;
    c) determining a display control schedule, comprising device control data, for said PCDD, said display control schedule being based on said notification of a power control event and said user preference data; and
    d) further adjusting said image content according to said display control schedule.

3. The method as described in claim 1 wherein said receiving a notification of a power control event occurs over a wireless network connection.

4. The method as described in claim 1 wherein said receiving a notification of a power control event occurs over an RF television channel.

5. The method as described in claim 1 wherein said receiving a notification of a power control event occurs over a cable television channel.

6. The method as described in claim 1 wherein said notification of a power control event is received from a power supplier.

7. A method for regulating power consumption with a power-controllable display device (PCDD), said method comprising:
    a) receiving a notification of a power control event at said (PCDD), wherein said PCDD comprises a display for displaying an image, wherein said PCDD is connected to an external power source managed by a power supplier charging a fee for power received from said external power source based on a variable rate, wherein said notification is received from said power supplier and said power control event relates to said variable rate;
    b) automatically, without manual input, adjusting image content to be displayed on said display in response to said power control event;
    c) wherein said adjusting comprises the application of a tone scale adjustment to said image content.

8. The method as described in claim 7 further comprising:
    a) prompting a user for user preference data related to power consumption by displaying a prompt on a display of said PCDD;
    b) receiving user preference data related to power consumption at said PCDD via a remote control device that controls said PCDD;
    c) determining a display control schedule, comprising device control data, for said PCDD, said display control schedule being based on said notification of a power control event and said user preference data; and
    d) further adjusting said image content according to said display control schedule.

9. The method as described in claim 7 wherein said receiving a notification of a power control event occurs over a wireless network connection.

10. The method as described in claim 7 wherein said receiving a notification of a power control event occurs over an RF television channel.

11. The method as described in claim 7 wherein said receiving a notification of a power control event occurs over a cable television channel.

12. The method as described in claim 7 wherein said notification of a power control event is received from a power supplier.

13. A method for regulating power consumption with a power-controlled display device (PCDD), said method comprising:
    a) receiving a notification of a power control event at said (PCDD), wherein said PCDD comprises a display for displaying an image, wherein said PCDD is connected to an external power source managed by a power supplier charging a fee for power received from said external power source based on a variable rate, wherein said notification is received from said power supplier and said power control event relates to said variable rate; and
    b) automatically, without manual input, reducing a display brightness setting on said display in response to said power control event.

14. The method as described in claim 13 further comprising:
    a) prompting a user for user preference data related to power consumption by displaying a prompt on a display of said PCDD;
    b) receiving user preference data related to power consumption at said PCDD via a remote control device that controls said PCDD;
    c) determining a display control schedule, comprising device control data, for said PCDD, said display control schedule being based on said notification of a power control event and said user preference data; and
    d) further adjusting said display brightness of said PCDD according to said display control schedule.

15. The method as described in claim 13 further comprising compensating an image to compensate for the reduced said brightness setting.

16. The method as described in claim 13 wherein the step of reducing a display brightness setting comprises analyzing image distortion at a plurality of brightness settings.

17. The method as described in claim 13 wherein said receiving a notification of a power control event occurs over an RF television channel.

\* \* \* \* \*